(12) United States Patent
Akiyama et al.

(10) Patent No.: US 8,222,328 B2
(45) Date of Patent: Jul. 17, 2012

(54) REINFORCING SHEET FOR REINFORCING TOOTHED BELT, AND TOOTHED BELT AND METHOD FOR PRODUCTION THEREOF

(75) Inventors: Mitsuharu Akiyama, Tokyo (JP); Naoya Mizukoshi, St. Helens (GB)

(73) Assignee: Nippon Sheet Glass Company, Limited, Tokyo (JP)

( * ) Notice: Subject to any disclaimer, the term of this patent is extended or adjusted under 35 U.S.C. 154(b) by 400 days.

(21) Appl. No.: 12/218,332

(22) Filed: Jul. 14, 2008

(65) Prior Publication Data

US 2008/0271638 A1 Nov. 6, 2008

Related U.S. Application Data

(63) Continuation of application No. 11/791,051, filed as application No. PCT/JP2005/020965 on Nov. 15, 2005.

(30) Foreign Application Priority Data

Nov. 19, 2004 (JP) ................................. 2004-336603

(51) Int. Cl.
*C08G 73/10* (2006.01)

(52) U.S. Cl. ........ 524/104; 524/105; 524/556; 524/558; 524/559; 524/560; 524/565

(58) Field of Classification Search .................. 524/104, 524/105, 565, 556, 558–560
See application file for complete search history.

(56) References Cited

U.S. PATENT DOCUMENTS

| | | | |
|---|---|---|---|
| 4,818,601 A | 4/1989 | Itoh et al. | |
| 5,203,189 A | 4/1993 | Lovejoy et al. | |
| 5,478,286 A | 12/1995 | Hamano et al. | |
| 5,484,341 A | 1/1996 | Fujiwara et al. | |
| 5,496,884 A * | 3/1996 | Weih et al. | 524/503 |
| 5,531,650 A | 7/1996 | Azuma | |
| 5,609,541 A | 3/1997 | Tachibana et al. | |
| 6,106,943 A * | 8/2000 | Akiyama | 428/375 |
| 6,117,035 A | 9/2000 | Isshiki et al. | |
| 7,265,185 B2 | 9/2007 | Guo et al. | |
| 2002/0179228 A1 | 12/2002 | Gibson et al. | |
| 2003/0171500 A1 | 9/2003 | Guo et al. | |
| 2006/0063884 A1 | 3/2006 | Akiyama | |

FOREIGN PATENT DOCUMENTS

| | | |
|---|---|---|
| EP | 1 394 315 A1 | 3/2004 |
| FR | 1 534 301 A1 | 7/1968 |
| FR | 2 611 209 A | 8/1988 |
| JP | 7-68467 | 3/1995 |
| JP | 7-167221 | 7/1995 |
| JP | 7-217705 | 8/1995 |
| JP | 7-259928 | 10/1995 |
| JP | 10-89418 | 4/1998 |
| JP | 2000-119615 | 4/2000 |
| JP | 2002-542078 | 12/2002 |
| JP | 2003-64190 | 3/2003 |
| JP | 2003-530467 | 10/2003 |
| JP | 2003-342420 | 12/2003 |
| JP | 2004-183121 A | 7/2004 |
| JP | 2004-256713 | 9/2004 |

* cited by examiner

*Primary Examiner* — Peter D Mulcahy
(74) *Attorney, Agent, or Firm* — Hamre, Schumann, Mueller & Larson, P.C.

(57) ABSTRACT

A method of manufacturing of the present invention is a method of manufacturing a toothed belt (10) having a belt part (13) and a tooth part (14) sticking out of the belt part (13). This method of manufacturing includes a first step of forming a reinforcing-sheet (12) including a fiber sheet and a coating film formed on the fiber sheet by drying the fiber sheet on which an aqueous treatment agent containing a first rubber latex and a first vulcanizing agent is applied, and a second step of reinforcing a surface of the tooth part (14) with the reinforcing-sheet (12) by vulcanizing the first rubber and a second rubber at the same time while adhering a rubber composition, which is a material for the tooth part (14), including the second rubber and a second vulcanizing agent to the reinforcing-sheet (12). The aqueous treatment agent contains the vulcanizing agent in the range of 10 parts by weight to 100 parts by weight for 100 parts by weight of the first rubber.

4 Claims, 1 Drawing Sheet

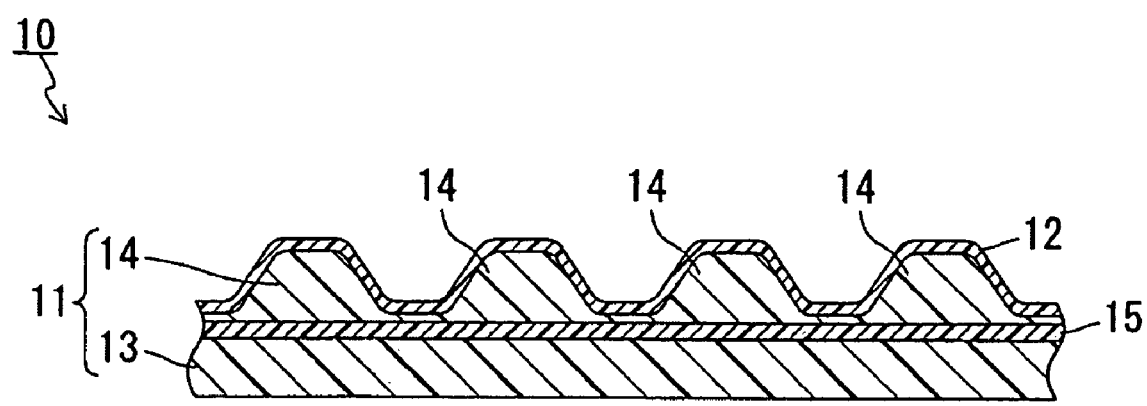

REINFORCING SHEET FOR REINFORCING TOOTHED BELT, AND TOOTHED BELT AND METHOD FOR PRODUCTION THEREOF

This application is a Continuation of application Ser. No. 11/791,051, filed May 17, 2007, which is a U.S. National Stage application of International Application No. PCT/JP2005/020965, filed Nov. 15, 2005, which applications are incorporated herein by reference.

TECHNICAL FIELD

The present invention relates to a reinforcing-sheet for reinforcing a toothed belt, to a toothed belt and to a method of manufacturing the same.

BACKGROUND ART

In order to improve durability and fraying resistance of toothed belts, it has been commonly practiced to bury fibers known as tooth sheet into a surface of their tooth parts. By using a tooth sheet, the durability of tooth parts and the fraying resistance of the rubber surface are improved. Fibers woven in a form of a sheet are generally employed as such a tooth sheet. A surface of the tooth sheet is generally processed by various treatment agents for enhancing adhesion of the belt body with its rubber matrix. As an example, a tooth sheet impregnated with rubber cement including a filler, such as carbon, after processing with a liquid mixture of a condensate of resorcinol and formaldehyde and latex is disclosed in JP7 (1995)-217705A. As another example, a tooth sheet processed with a rubber composition obtained by mixing N, N'-m-phenylene dimaleimide into hydrogenated nitrile rubber is disclosed in JP7 (1995)-259928A.

While adhesion under a static test of the conventional tooth sheets processed with the treatment agents is relatively high, the conventional tooth sheets easily crack between themselves and cords or rubber matrixes due to their poor integration with the belt parts when run for many hours as a belt. As a result, troubles were prone to arise, such as chipping in the tooth part. In addition, it was necessary to protect the environment during the manufacturing processes when a tooth sheets is treated with a conventional treatment agent using an organic solvent.

DISCLOSURE OF INVENTION

With such a situation in mind, one of the objects of the present invention is to provide a reinforcing-sheet for reinforcing a toothed belt. capable of forming a toothed belt that is easy to manufacture and has less fracture in a tooth part even when used for many hours. Furthermore, other objects of the present invention are to provide a toothed belt using a reinforcing-sheet for a toothed belt according to the present invention and to provide a method of manufacturing the same.

In order to achieve the above-mentioned objects, the reinforcing-sheet of the present invention is a reinforcing-sheet for reinforcing a toothed belt that includes a fiber sheet and a coating film formed on the fiber sheet. The coating film is formed by drying the fiber sheet on which an aqueous treatment agent containing a rubber latex and a vulcanizing agent as its main components is applied. The aqueous treatment agent contains the vulcanizing agent in the range of 10 parts by weight to 100 parts by weight for 100 parts by weight of the rubber.

The method for manufacturing a toothed belt of the present invention is a method of manufacturing a toothed belt that has a belt part and a tooth part sticking out of the belt part. The method of the present invention includes a first step of forming a reinforcing-sheet including a fiber sheet and a coating film formed on the fiber sheet by drying the fiber sheet on which an aqueous treatment agent containing a first rubber latex and a first vulcanizing agent is applied; and a second step of reinforcing a surface of the tooth part with the reinforcing-sheet by vulcanizing the first rubber and a second rubber at the same time while adhering a rubber composition, which is a material for the tooth part, including a second rubber and a second vulcanizing agent to the reinforcing-sheet. The aqueous treatment agent contains the vulcanizing agent in the range of 10 parts by weight to 100 parts by weight for 100 parts by weight of the first rubber.

The toothed belt of the present invention is a toothed belt manufactured by the method of manufacturing of the present invention described above.

According to the present invention, a reinforcing-sheet capable of forming a toothed belt having excellent heat resistance and bending fatigue resistance can be obtained. Since the aqueous treatment agent employed for the reinforcing-sheet does not generally contain substances having a heavy environmental load, such as an organic solvent, formaldehyde and ammonia, a working environment during the coating film forming step is favorable.

BRIEF DESCRIPTION OF DRAWINGS

FIG. 1 is a cross-sectional view that schematically shows an example of a toothed belt manufactured by the manufacturing method of the present invention.

BEST MODE FOR CARRYING OUT THE INVENTION

Hereinafter, embodiments of the present invention are described in detail.

[Reinforcing-Sheet for a Toothed Belt]

A reinforcing-sheet (a tooth sheet) for a toothed belt of the present invention includes a fiber sheet and a coating film formed on the fiber sheet. The coating film is formed by drying the fiber sheet on which an aqueous treatment agent (an aqueous adhesive) containing a rubber (hereinafter, also referred to as a "first rubber") latex and a vulcanizing agent as its main components is applied. The aqueous treatment agent contains the vulcanizing agent in the range of 10 parts by weight to 100 parts by weight for 100 parts by weight of the first rubber (of solid content).

It is preferable that the aqueous treatment agent further contains carbon black. Adding carbon black enables cost reduction for manufacturing a reinforcing-sheet. Since carbon black enables enhancing cohesion of the coating component, heat resisting adhesion of a reinforcing-sheet and a tooth rubber can be enhanced effectively. Although an organic/inorganic filler, such as silica and talc, other than carbon black may be blended, carbon black is still preferable from the perspective of its reinforcing effect and its stability.

The aqueous treatment agent contains the first rubber latex and the vulcanizing agent as its main components. That is, the first rubber (solid content) and the vulcanizing agent are, in total, 50 wt. % or more (for example, 70 wt. % or more) of the whole components (other than the solvent and the dispersion medium) of the aqueous treatment agent.

Examples of the vulcanizing agent may include the following agents: quinone dioxime vulcanizing agents, such as p-quinonedioxime; methacrylate vulcanizing agents, such as lauryl methacrylate and methyl methacrylate; allyl vulcanizing agents, such as DAF (diallyl fumarate), DAP (diallyl phthalate), TAC (triallylcyanurate), and TAIC (triallyl isocyanurate); maleimide vulcanizing agents, such as bismaleimide, phenyl maleimide, and diphenylmethane-4,4'-bismaleimide (N, N'-(4,4'-diphenylmethane) bismaleimide); aromatic or aliphatic organic diisocyanate; aromatic nitroso compound and sulfur. These vulcanizing agents may be employed alone or in combination of a plurality of them. The vulcanizing agents are selected in consideration of conditions, such as the type of rubber.

Among them, it is preferred to employ at least one vulcanizing agent selected from maleimide vulcanizing agents, organic diisocyanate and aromatic nitroso compound. By employing them, the adhesion of the reinforcing-sheet and the rubber matrix specifically can be enhanced. In particular, diphenylmethane-4,4'-bismaleimide is excellent in stability when dispersed in water, cross-linking effect and heat resistance after vulcanization.

Examples of the first rubber latex included in the aqueous treatment agent may include the following latexes: butadiene-styrene copolymer latex, dicarboxylated butadiene-styrene copolymer latex, vinylpyridine-butadiene-styrene terpolymer latex, chloroprene latex, butadiene rubber latex, chlorosulfonated polyethylene latex, nitrile rubber latex (acrylonitrile-butadiene copolymer latex) and hydrogenated nitrile rubber latex. These rubber latexes may be employed alone or in combination.

Among them, it is preferred to employ at least one rubber selected from nitrile rubber and hydrogenated nitrile rubber as the first rubber. These rubbers are excellent in heat resisting adhesion and fraying resistance. When hydrogenated nitrile rubber is employed for the rubber matrix, compatibility of the coating film and the rubber matrix is improved by employing hydrogenated nitrile rubber latex.

The first rubber may be a carboxylated rubber. By employing the carboxylated rubber, its adhesion can be enhanced further. The carboxylated rubber is not particularly limited, and a rubber obtained by carboxylated of any rubber mentioned above may be employed, for example.

The aqueous treatment agent may include other substances, such as a peroxide, a plasticizer, an antioxidant, a metal oxide and a stabilizer.

The components mentioned above are dispersed or dissolved in an aqueous solvent of the aqueous treatment agent. An aqueous solvent has an excellent handling property and enables easy control of the concentrations of the components. In addition, it remarkably reduces the environmental load compared to an organic solvent. The aqueous solvent contains water as its main component (50 wt. % or more, preferably 65 wt. % or more), and an example of such an aqueous solvent is made of water alone substantially. The aqueous solvent may contain lower alcohol. It is preferable that the aqueous solvent does not substantially contain formaldehyde, ammonia and organic solvent other than lower alcohol.

The aqueous treatment agent contains the vulcanizing agent in the proportions of 10 parts by weight to 100 parts by weight for 100 parts by weight of the first rubber. In this case, it is preferable that the aqueous treatment agent contains carbon black in the proportions of 5 parts by weight to 70 parts by weight for 100 parts by weight of the first rubber. The aqueous treatment agent preferably contains the vulcanizing agent in the range of 20 parts by weight to 75 parts by weight for 100 parts by weight of the first rubber, and further preferably contains it in the range of 30 parts by weight to 75 parts by weight. By using such an aqueous treatment agent, a high adhesion can be obtained even with a single layer coating film. In such a case, it is preferable that the aqueous treatment agent contains carbon black in the range of 10 parts by weight to 30 parts by weight for 100 parts by weight of the first rubber.

The relationship between the amounts of rubber and vulcanizing agent in the aqueous treatment agent is particularly important. The vulcanizing agent in the treatment agent is spread into the rubber matrix when vulcanizing both the first rubber and the rubber matrix, which enables the reinforcement of the vulcanization of not only the coating film but also the rubber matrix. As a result, excellent adhesion strength and integration can be obtained. When the amount of vulcanizing agent is too little, the coating film itself can be vulcanized to some extent, but the reinforcing effect of the rubber matrix cannot be obtained. The integration of the reinforcing-sheet and the rubber matrix becomes insufficient, accordingly, and a sufficient adhesion strength cannot be obtained. On the other hand, when the amount of vulcanizing agent is too much, the coating film increases its degree of hardness, and it leads to a decrease in strength of the toothed belt when the belt is bent.

Examples of a preferable combination of the first rubber and the vulcanizing agent may include a hydrogenated nitrile rubber with a maleimide vulcanizing agent, a carboxylated nitrile rubber with a maleimide vulcanizing agent and a carboxylated hydrogenated nitrile rubber with a maleimide vulcanizing agent. Employing such combination enables particularly the adhesion of the reinforcing-sheet with the rubber matrix to be enhanced.

The fiber sheet is a sheet constituted by reinforcing fibers. The reinforcing fibers are not particularly limited as long as they enhance shape stability and strength of the reinforcing-sheet. For example, glass fibers; polyvinyl alcohol fibers, such as vinylon fibers; polyester fibers; polyamide fibers, such as nylon and aramid (aromatic polyamide) fibers; carbon fibers and polyparaphenylene benzoxazole (PBO) fibers may be employed. A preferable example of the fiber sheet is made of nylon fibers knitted in a form of a sheet. These fibers may be employed alone or in combination of a plurality of them. The fiber sheet is not limited in its form as long as it keeps a form of a sheet, and it may be either a woven or a nonwoven sheet.

The coating film on the fiber sheet includes an unvulcanized rubber and a vulcanizing agent. The amount of coating film is not particularly limited, and an example of the proportions of coating film occupied in the whole reinforcing-sheet may be in a range of 5 wt. % to 30 wt. %, such as 6 wt. % to 15 wt. %.

The reinforcing-sheet of the present invention includes a coating film covering a fiber sheet, and the coating film contains a vulcanizing agent in high proportion. When the reinforcing-sheet and a rubber matrix of a toothed belt are integrated, the vulcanizing agent enhances integration of the reinforcing-sheet and the rubber matrix by being spread into the rubber matrix. Thus, according to the reinforcing-sheet of the present invention, a toothed belt having less fracture in the tooth part under many hours of use can be obtained. In addition, since a treatment agent employed for manufacturing this reinforcing-sheet includes an aqueous solvent, the environmental load is small and the handling property during manufacture is facilitated. The reinforcing-sheet of the present invention is easy to manufacture because the coating film is normally a single layer. A method of manufacturing the reinforcing-sheet is described below.

[Method of Manufacturing a Toothed Belt]

A manufacturing method of the present invention is a method of manufacturing a toothed belt having a belt part and a tooth part sticking out of the belt part. A toothed belt manufactured by this manufacturing method is a toothed belt of the present invention.

This manufacturing method includes a step (a first step) of forming a reinforcing-sheet including a fiber sheet and a coating film formed on the fiber sheet by drying the fiber sheet on which an aqueous treatment agent containing a first rubber latex and a first vulcanizing agent is applied. The reinforcing-sheet of the present invention can be obtained by this step. The materials, such as the fiber sheet and the aqueous treatment agent, and the proportions of materials are as described above and the overlapping description is omitted. For instance, the vulcanizing agents mentioned above may be employed for the first vulcanizing agent.

The method of forming the coating film is not particularly limited. For example, the coating film may be formed by immersing the fiber sheet in a container with the aqueous treatment agent and drawing up the fiber sheet from the container, and removing the solvent through a drying furnace. The method of drying is not particularly limited, and drying by heating may be applied, for example. In the first step, however, the fiber sheet is dried under the condition that restrains the vulcanization of the first rubber in the aqueous treatment agent from progressing. For example, the fiber sheet may be dried by exposing it to an atmosphere at a temperature in the range of 80° C. to 160° C. for 0.1 minute to 2 minutes. The coating film formed in the first step includes a vulcanizing agent and an unvulcanized rubber or a rubber vulcanized insufficiently.

Next, a surface of the tooth part is reinforced with the reinforcing-sheet vulcanizing the first rubber and a second rubber (a rubber in a rubber composition) at the same time while adhering the rubber composition, which is a material for the tooth part, to the reinforcing-sheet (a second step). The rubber composition contains a second rubber and a second vulcanizing agent as its main components. The drying condition during the vulcanization is selected according to the type and the amount of rubber and vulcanizing agent. In the second step, generally, the first rubber and the second rubber are heated for vulcanization while the rubber composition, which is a material for the belt body (the belt part and the tooth part), is adhered to the reinforcing-sheet. The rubber composition may be formed in a predetermined shape either before or after the vulcanization.

The second rubber (the rubber matrix) is selected according to the property required for the toothed belt. The rubbers mentioned as the first rubber may be applied for the second rubber, for example. Although the first and the second rubbers may be either the same or different, the integration of the reinforcing-sheet with the belt body can be enhanced by employing the same rubber for both of them. The rubber composition is either an unvulcanized rubber or a rubber vulcanized incompletely, and contains an additive, such as a vulcanizing agent. The vulcanizing agent is not particularly limited, and the vulcanizing agents mentioned above and known vulcanizing agents may be applied.

The reinforcing-sheet generally is disposed to cover the entire surface side of the belt body (the belt part and the tooth part) on which the tooth part is formed, i.e. a surface of the tooth part (a convex part) and a surface of the concave part on which the tooth part is not formed, and reinforces those surfaces. A method of integrating the reinforcing-sheet and the toothed belt is not particularly limited, and a known method may be applied. An example of such a method may be a method in which the reinforcing-sheet, a reinforcing cord and a sheet of rubber composition as the material for the belt body are wound in this order on a cylindrical mold on which a concave part is formed at a position according to the tooth part, and then subjected to heat and pressure from the outside. In this method, the tooth part and the belt part are formed by forming the sheet of rubber composition, and then the reinforcing-sheet is disposed on their surfaces. The first and the second rubbers are vulcanized at the same time when heat and pressure are applied. Some modifications may be allowed, such as disposing another reinforcing-sheet on the surface of the other side from the tooth part, forming the sheet of rubber composition in bi-layer structure or further interposing another reinforcing-sheet in the bi-layer structure.

A cross-sectional view of an example of the toothed belt manufactured by the manufacturing method of the present invention is schematically shown in FIG. 1. A toothed belt 10 in FIG. 1 includes a belt body 11 and a reinforcing-sheet 12. The belt body 11 includes a belt part 13 and a plurality of tooth parts 14, which stick out of the belt part 13 at regular intervals. The reinforcing-sheet 12 is disposed to cover one of surfaces of the belt body 11 on which the tooth parts 14 are formed. The belt part 13 has a reinforcing cord 15 buried therein. A strand covered by a coating film including rubber may be used for the reinforcing cord 15, for example. The strand may be formed with reinforcing fibers, such as glass fibers and resin fibers. The coating film of the reinforcing cord 15 may be formed with the aqueous adhesive described above, for example. The rubber in the coating film of the reinforcing cord 15 preferably is vulcanized at the same time with the first rubber and the rubber matrix.

Since both the first rubber of the reinforcing-sheet and the second rubber constituting the tooth part are vulcanized at the same time in the manufacturing method of the present invention, it becomes possible to enhance the integration of the reinforcing-sheet with the belt body dramatically. Because the vulcanizing agent included in the coating film of the reinforcing-sheet is spread into the second rubber in this method, the integration of the reinforcing-sheet with the belt body particularly can be enhanced. This effect is enhanced particularly when the aqueous treatment agent contains the vulcanizing agent in the range of 30 parts by weight to 75 parts by weight for 100 parts by weight of the first rubber.

According to the method of the present invention, a toothed belt having excellent heat resistance, integration under many hours of use and bending fatigue resistance can be obtained.

EXAMPLES

Hereinafter, the present invention is described further using examples.

Example 1

A reinforcing-sheet for a toothed belt was formed by applying an aqueous treatment agent indicated in (1) of Table 1 on nylon fibers knitted in a sheet and then by drying at a temperature of 120° C. for one minute.

TABLE 1

| Components | Weight Ratio of Solid Content | | | |
|---|---|---|---|---|
| | (1) | (2) | (3) | (4) |
| Hydrogenated Nitrile Rubber Latex (*1) | 100 | 100 | 100 | |
| Nitrile Rubber Latex (*2) | | | | 100 |
| Carbon Black | 20 | 20 | 20 | 20 |

TABLE 1-continued

|  | Components | Weight Ratio of Solid Content | | | |
|---|---|---|---|---|---|
|  |  | (1) | (2) | (3) | (4) |
| Vulcanizing Agent | Diphenylmethane-4,4'-bismaleimide | 50 |  |  | 50 |
|  | Organic Diisocyanate (*3) |  | 50 |  |  |
|  | Aromatic Nitroso-Compound |  |  | 50 |  |
| Total |  | 170 | 170 | 170 | 170 |

(*1) Carboxylated Hydrogenated Nitrile Rubber Latex, manufactured by ZEON Corporation
(*2) High Acrylonitrile-Butadiene Copolymer Latex, manufactured by ZEON Corporation
(*3) Hexamethylene Diisocyanate Meanwhile, a reinforcing cord was formed by processing glass fibers with an RFL treatment liquid in (2) of Table 2, i.e. a mixture of a resorcinol-formaldehyde condensate and hydrogenated nitrile rubber latex. The reinforcing-sheet and the reinforcing cord were heat treated with a rubber composition (rubber matrix) having a composition indicated in Table 3 at a temperature of 170° C. for 30 minute in order to vulcanize the rubber of the reinforcing-sheet and the rubber matrix at the same time.

TABLE 2

| Components | Weight Ratio of Solid Content | |
|---|---|---|
|  | (1) | (2) |
| Hydrogenated Nitrile Rubber Latex (*1) | 100 | 100 |
| Carbon Black | 20 |  |
| Vulcanizing Agent (Diphenylmethane-4,4'-bismaleimide) | 5 |  |
| Resorcinol-Formaldehyde Condensate |  | 9 |
| Total | 125 | 109 |

(*1) Carboxylated Hydrogenated Nitrile Rubber Latex, manufactured by ZEON Corporation

TABLE 3

| Components | Weight Ratio |
|---|---|
| H-NBR (*4) | 70 |
| H-NBR/ZDMA (*5) | 30 |
| ZnO | 10 |
| Stearic Acid | 1 |
| Carbon Black | 30 |
| TOTM (Trioctyl Trimellitate) | 5 |
| Sulfur | 0.1 |
| 1,3-Bis-(t-butylperoxy-isopropyl)-benzene | 6 |
| Total | 152.1 |

(*4) Hydrogenated Nitrile Rubber (manufactured by ZEON Corporation: ZETPOL 2020 (trade name))
(*5) Hydrogenated Nitrile Rubber including Zinc Dimethacrylate (manufactured by ZEON Corporation: ZSC 2000L (trade name))

A toothed belt having a reinforcing-sheet disposed on the surface of the side of tooth part and a reinforcing cord buried in the belt part was manufactured in the manner described above.

Example 2

Another toothed belt was fabricated under the same condition as Example 1 except for employing an aqueous treatment agent indicated in (2) of Table 1 instead of the aqueous treatment agent of (1) of Table 1.

Example 3

Another toothed belt was fabricated under the same condition as Example 1 except for employing an aqueous treatment agent indicated in (3) of Table 1 instead of the aqueous treatment agent of (1) of Table 1.

Example 4

Another toothed belt was fabricated under the same condition as Example 1 except for employing an aqueous treatment agent indicated in (4) of Table 1 instead of the aqueous treatment agent of (1) of Table 1.

Example 5

An aqueous treatment agent that is the same as the aqueous treatment agent of (1) of Table 1, except for employing hydrogenated nitrile rubber latex that is not carboxylated instead of carboxylated hydrogenated nitrile rubber latex, was prepared. Another toothed belt was fabricated under the same condition as Example 1 except for employing this aqueous treatment agent instead of the aqueous treatment agent of (1) of Table 1.

Comparative Example 1

Another toothed belt was fabricated under the same condition as Example 1 except for employing an aqueous treatment agent indicated in (1) of Table 2 instead of the aqueous treatment agent of (1) of Table 1.

Comparative Example 2

Another toothed belt was fabricated under the same condition as Example 1 except for employing an RFL treatment liquid indicated in (2) of Table 2 instead of the aqueous treatment agent of (1) of Table 1.

For the toothed belts of the Examples and Comparative Examples, the peel strength of the reinforcing-sheet and the rubber matrix was tested to measure the adhesion strength between them and to observe each fracture type. In addition, bending run properties of these toothed belts were tested under an atmosphere at a temperature of 140° C. for 100 hours to check the presence of peeling on the reinforcing-sheets after running. Moreover, the strength of the toothed belts before and after the running test was measured to calculate the proportion of strength before the running test to strength after the running test, i.e. the strength retention rate. Results of the evaluation are shown in Table 4.

TABLE 4

|  | Examples | | | | | Comparative Examples | |
|---|---|---|---|---|---|---|---|
|  | 1 | 2 | 3 | 4 | 5 | 1 | 2 |
| Adhesion Strength [N/19 mm] | 450 | 390 | 330 | 480 | 320 | 200 | 30 |

TABLE 4-continued

|  | Examples | | | | | Comparative Examples | |
| --- | --- | --- | --- | --- | --- | --- | --- |
|  | 1 | 2 | 3 | 4 | 5 | 1 | 2 |
| Fracture Type | Rubber Fracture | Rubber Fracture | Rubber Fracture | Rubber Fracture | Rubber Fracture | Partial Rubber Fracture | Interfacial Peeling |
| Crack after the Running Test | Not Found | Not Found | Not Found | Not Found | Not Found | Found | Found |
| Strength Retention (%) | 80 | 75 | 70 | 71 | 70 | 60 | 30 |

As shown in Table 4, the toothed belts of Examples were higher in their adhesion strength of the reinforcing-sheet and rubber matrix than those of Comparative Examples. In addition, no crack was found in the toothed belts of the Examples after the running test, and they showed higher strength retention than those of the Comparative Examples. Moreover, the adhesion strength of the reinforcing-sheet and the rubber matrix was particularly high when the carboxylated rubber latex was employed.

The present invention is applicable to other embodiments as long as they do not depart from the intention and essential characteristics thereof. The embodiments disclosed in this specification are to be considered in all respects as illustrative and not limiting. The scope of the present invention is indicated by the appended claims rather than by the foregoing description, and all changes that come within the meaning and range of equivalency of the claims are intended to be embraced therein.

INDUSTRIAL APPLICABILITY

The present invention is applicable to a reinforcing-sheet for a toothed belt, to a toothed belt and to a method of manufacturing the same.

The invention claimed is:

1. An aqueous treatment agent to be applied on a reinforcing fiber of a reinforcing sheet or on a reinforcing fiber of a reinforcing cord, the aqueous treatment agent comprising a rubber latex and a vulcanizing agent, as main components of the aqueous treatment agent,
   wherein the aqueous treatment agent contains the vulcanizing agent in the range of 10 parts by weight to 100 parts by weight for 100 parts by weight of the rubber,
   the rubber is a carboxylated hydrogenated nitrile rubber,
   the vulcanizing agent is a maleimide vulcanizing agent, and
   the aqueous treatment agent does not contain a reaction product of resorcinol and formaldehyde.

2. The aqueous treatment agent according to claim 1, further comprising carbon black.

3. The aqueous treatment agent according to claim 1, wherein the vulcanizing agent is diphenylmethane-4,4'-bis-maleimide.

4. The aqueous treatment agent according to claim 1, wherein a total amount of the rubber latex and the vulcanizing agent is 50 wt. % or more relative to a solid content of the aqueous treatment agent.

* * * * *

UNITED STATES PATENT AND TRADEMARK OFFICE
CERTIFICATE OF CORRECTION

PATENT NO. : 8,222,328 B2
APPLICATION NO. : 12/218332
DATED : July 17, 2012
INVENTOR(S) : Akiyama et al.

Page 1 of 1

It is certified that error appears in the above-identified patent and that said Letters Patent is hereby corrected as shown below:

Column 1, line 50: delete "belt." and insert --belt--.
Column 2, line 27: delete "DRAWINGS" and insert --DRAWING--.

Signed and Sealed this
Eighth Day of January, 2013

David J. Kappos
*Director of the United States Patent and Trademark Office*